United States Patent [19]
Holtmyer et al.

[11] Patent Number: 5,122,549
[45] Date of Patent: * Jun. 16, 1992

[54] CROSSLINKABLE CELLULOSE DERIVATIVES

[75] Inventors: Marlin D. Holtmyer; Charles V. Hunt, both of Duncan, Okla.

[73] Assignee: Halliburton Company, Duncan, Okla.

[*] Notice: The portion of the term of this patent subsequent to Jan. 8, 2008 has been disclaimed.

[21] Appl. No.: 742,115

[22] Filed: Aug. 8, 1991

Related U.S. Application Data

[60] Division of Ser. No. 592,770, Oct. 4, 1990, Pat. No. 5,067,565, which is a continuation-in-part of Ser. No. 322,155, Mar. 10, 1989, Pat. No. 4,982,793.

[51] Int. Cl.$^5$ .......................... C09K 7/00; E21B 43/04
[52] U.S. Cl. ..................................................... 523/130
[58] Field of Search ...................... 252/8.551; 166/270, 166/271, 276, 278, 280, 294, 295, 300, 308, 305.1; 523/130, 131

[56] References Cited

U.S. PATENT DOCUMENTS 4,982,793 1/1991 Holtmyer et al. ............... 166/305.1

OTHER PUBLICATIONS

Malkiat S. Bains Journal of Polymer Science, part c, Polymer Symposia, pp. 125–151.

*Primary Examiner*—Nathan M. Nutter
*Assistant Examiner*—Jeffrey Culpepes Mullis
*Attorney, Agent, or Firm*—Robert A. Kent

[57] ABSTRACT

Novel treating fluid compositions containing crosslinkable non-ionic cellulose derivatives and methods of use in petroleum recovery operations are disclosed. The treating fluid polymers are prepared by reacting vinyl monomers having a crosslinkable substituent with a cellulose derivative using a redox system comprising the reaction product of hydrogen peroxide with ferrous salt. The polymers readily crosslink with polyvalent metal ions, such as zirconium and titanium, to form temperature-stable gels useful in petroleum recovery operations.

5 Claims, No Drawings

CROSSLINKABLE CELLULOSE DERIVATIVES

CROSS REFERENCE TO RELATED APPLICATION

This application is a divisional, of application Ser. No. 592,770, filed Oct. 4, 1990, now U.S. Pat. No. 5,067,569 which is a continuation-in-part of U.S. application Ser. No. 322,155, filed Mar. 10, 1989, now U.S. Pat. No. 4,982,793.

BACKGROUND OF THE INVENTION

This invention relates to copolymers of cellulose ether derivatives that are soluble in aqueous liquids and capable of crosslinking with polyvalent metal cations to form viscoelastic gels which are useful in petroleum recovery operations.

Petroleum recovery operations, such as well stimulation and gravel packing, often require the use of fluid compositions capable of suspending particles. In gravel packing operations, a pack of gravel is placed on the exterior of a perforated or slotted liner or screen which is positioned across an unconsolidated formation. The resulting structure presents a barrier to migrating sand from the formation while still permitting fluid flow. The gravel is carried to the formation in the form of a slurry by mixing gravel with a viscosified fluid. Once the gravel is placed in the wellbore, the viscosified carrier fluid is degraded and returned to the surface.

Treating fluids are used similarly in stimulating subterranean formations. The viscosified fluid carries a propping agent through the wellbore and into both natural fractures and fractures in the formation caused by hydraulic pressure. Once the desired fracture occurs, the fluid is degraded and returned to the surface leaving the proppant in the formation to provide a conductive channel through which formation fluids can flow. In both stimulation and gravel packing operations, the most desirable treating fluid reduces friction pressure as the fluid is pumped through the tubular goods and transports the propping agent or gravel to the formation without particle settling in the wellbore during placement.

Treating fluids with these properties are generally comprised of a hydratable polysaccharide, including but not limited to guar, guar derivatives, and cellulose derivatives. These polymers viscosify aqueous liquids to form solutions which inhibit particle settling to a limited extent by virtue of viscosity. However, these polymer solutions can approach near zero particle settling rates upon crosslinking with multivalent metal cations to form highly viscoelastic gels. The utility of these gels is well known in the art of petroleum recovery operations.

Cellulose derivatives are the preferred viscosifying polymers for certain petroleum recovery operations because they degrade, i.e., lose viscosity without generating water insoluble particles or residue. The water insoluble particles are believed to remain in the formation and may cause formation plugging or impair the permeability of sand or gravel packs. However, cellulose derivatives have had limited use in many petroleum applications because most derivatives are salt sensitive or not crosslinkable. Non-ionic derivatives of cellulose are generally not crosslinkable because the polymer lacks a site for attachment of a multivalent metal cation. Examples of this type include hydroxyalkyl cellulose ethers, methyl cellulose, ethyl cellulose, and hydroxyalkyl methyl cellulose. A crosslinkable non-ionic cellulose derivative has been prepared and described in U.S. Pat. Nos. 4,523,010 and 4,552,215 which are herein incorporated by reference. In these disclosures, dihydroxypropyl hydroxyalkyl cellulose is prepared by a condensation reaction of glycidol with hydroxyethyl cellulose under alkaline conditions. The glycidol addition along the HEC polymer chain provides a site of attachment for multivalent metal cations.

Anionic cellulose derivatives are normally substituted with carboxyl groups along the polymer chain. The carboxyl groups complex with polyvalent metal cations, such as aluminum. Gels formed with this chemistry tend to have limited structural stability at formation temperatures of about 250° F. In addition, carboxylate substituents render the polymer salt sensitive, i.e., the viscosity of the polymer in a salt solution is less than the viscosity in water. Salt sensitivity is not a desirable property because the aqueous liquids used in recovery operations must generally contain chloride salts to inhibit the swelling of formation clays.

The present invention provides new and useful crosslinkable graft copolymers of cellulose derivatives, which are generally non-ionic in character. Methods of grafting monomers on polyhydroxy containing compounds are well known in the art. The process is described in U.S. Pat. No. 2,922,768, herein incorporated by reference, in which a vinylidene monomer is polymerized with an organic reducing agent, such as cellulose, in the presence of a ceric salt in aqueous medium under acidic conditions. In accordance with the present invention, crosslinkable cellulose derivatives are prepared by grafting vinyl or allyl monomers having a crosslinkable substituent onto the cellulose derivative. The resulting copolymer is non-ionic and crosslinks readily with polyvalent metal cations to form stable viscoelastic gels, thus overcoming the deficiencies of non-ionic and anionic cellulose derivatives currently used in petroleum recovery operations.

SUMMARY OF THE INVENTION

The surprising discovery has been made that certain graft copolymers of hydroxyethyl cellulose can be crosslinked with multivalent metal cations. The crosslinkable copolymers are formed in one embodiment by the free radical addition of vinyl or allyl monomers having a crosslinkable substituent to cellulose derivatives using a redox system of ceric ions in acidic medium. A more surprising discovery has been made that acidic ceric ion treatment of a non-ionic cellulose derivative alone yields a crosslinkable polymer. In an alternate embodiment, the crosslinkable copolymer is produced by the free radical addition of vinyl monomers having a crosslinkable substituent to cellulose derivatives using a redox system resulting from the reaction of hydrogen peroxide with a ferrous compound. These compounds are particularly useful in petroleum recovery operations in which crosslinkable cellulose derivatives are used to provide highly viscoelastic gels that degrade without generating significant quantities of water insoluble residue.

DETAILED DESCRIPTION

The present invention provides a composition and method for treating subterranean formations. The treating fluid composition of the present invention comprises an aqueous liquid, a novel crosslinkable copolymer of HEC and a selected crosslinking agent. The fluid composition can be used in petroleum recovery operations, such as stimulation, gravel packing and other well completion operations. In these operations, the treating fluid performs a variety of functions, for example, (1) reducing friction pressure as the fluid is pumped through tubular goods and down the wellbore and (2) to carry propping agents or gravel packing materials to the formation without settling. A highly viscoelastic fluid is often times required to transport propping agents or gravel packing materials to the formation without settling. In addition, the treating fluid must have stable viscosity at formation temperatures. The present invention provides such a fluid.

An aqueous liquid is used to solubilize the novel copolymer of the present invention. The term "aqueous liquid" is used hereafter to mean any liquid containing sufficient water to at least partially hydrate the copolymer and result in an increase in the viscosity of the fluid. Aqueous liquids used in petroleum recovery operations normally contain sodium chloride, potassium chloride, or other salts to inhibit the swelling of clays generally found in subterranean formations. The pH of the aqueous liquid must be compatible with the selected crosslinking agent and must not adversely affect the hydration of the copolymer.

In one embodiment of the present invention, the crosslinkable copolymers are prepared by reacting certain allyl or vinyl monomers having a crosslinkable substituent, such as vicinal dihydroxy groups or a vinyl phosphonic acid, with a cellulose derivative using a redox system comprising ceric ions and nitric acid. The generalized reaction is believed to be represented by the formula:

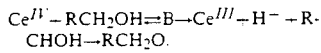

where B is the ceric-alcohol complex, R is the cellulose derivative and RCHOH is a free radical. Graft copolymerizations of cellulose commonly use chemical initiators, such as ceric ions. In acid media, ceric ions oxidize 1,2-glycols with the formation of a free radical on a reducing agent, which is the cellulose derivative in this case. The free radical produced on the cellulose derivative initiates polymerization with the vinyl group of the monomer to produce the graft copolymer.

The cellulose derivative of this invention is preferably a hydroxyalkyl cellulose having a hydroxyalkyl molar substitution from about 1.5 to about 3.0. Molar substitution is defined as the average number of moles of a substituent group present per anhydrogluclose unit of the cellulose material. The alkyl group is selected from the group of ethyl, propyl and mixtures thereof. The preferred hydroxyalkyl cellulose is hydroxyethyl cellulose (HEC) having a molar substitution in the range of about 1.8 to about 2.5. Preferably in this invention, the hydroxyalkyl cellulose is preformed in a separate reaction. Hydroxyethyl cellulose is usually formed by reacting ethylene oxide with cellulose under extreme alkaline conditions and is available commercially.

The copolymers of the present invention are rendered crosslinkable by grafting certain allyl or vinyl monomers having vicinal dihydroxy groups or a vinyl phosponic acid to the cellulose derivative. The monomers have the reactive $CH_2=C-$ moiety that is believed to enable the monomer to attach to a hydroxyl group of the cellulose derivative. The monomer of the present invention must also provide a crosslinkable substituent, such as a vicinal dihydroxy group or a phosphonate group, which enables the copolymer to crosslink upon solvation. The preferred grafting monomers for practicing this invention include, but are not limited to, glyceryl allyl ether (GAE), 2,3-dihydroxypropylmethacrylate (DHPM), vinyl phosphonic acid (VPA), allyl glycidyl ether (AGE), and glycidyl methacrylate (GMA). For copolymers containing AGE and GMA, the epoxide group must be hydrolyzed to render the polymer crosslinkable. The most preferred grafting monomers are GMA and VPA.

Typically, graft copolymerizations are carried out in aqueous media wherein the polymer is dissolved or dispersed. Copolymers of this invention were prepared in acetone (55% to 90%) and water (45% to 10%) or methanol (about 70%) and water (about 30%). Reactions were carried out in a 1 liter kettle with a stirrer or a 1 liter jar at about 20° C. to about 60° C. The ratio of cellulose derivative to aqueous medium ranges from about 1 g per 100 ml to about 1 g per 4 ml. The preferred ratio is from about 1 g/6 ml to 1 g/4 ml. The ratio of cellulose derivative to grafting monomer ranges from about 3 g per 1 ml to about 25 g per 1 ml. The preferred ratio is from about 6 g/1 ml to about 12 g/1 ml.

The polymerization reaction of the present invention may be chemically initiated by a redox system comprising ceric ions in acidic medium. Ceric ions may be provided, for example, by salts such as ceric nitrate, ceric sulfate, ceric ammonium nitrate, and ceric ammonium sulfate. The preferred ceric initiator of the present invention is a solution of ceric ammonium nitrate in 1N nitric acid. Ceric ammonium nitrate is present in an amount of from about 0.00075 mole/100 ml to about 0.005 mole/100 ml reaction medium.

The ceric initiator may be added slowly to the reaction material over a time period of about 30 to 90 seconds or longer. Reaction times vary from about 10 minutes to 20 hours depending on reaction conditions or the particular grafting monomer. Grafting reaction efficiency is generally less than about 50%. Typical conditions for the various grafting monomers are shown in the examples. After the reaction is complete, the polymerization product is washed with acetone, filtered, and dried.

In preparing the copolymers of this invention, the discovery was made that treatment of hydroxyalkyl cellulose with only ceric ammonium nitrate (CAN)/nitric acid solution also rendered the polymer crosslinkable. Tests were conducted in which the grafting monomer was omitted from the reaction and the resulting product was to serve as a control sample. Surprisingly, the ceric ammonium nitrate/nitric acid treatment produced a hydroxyalkyl cellulose capable of crosslinking with a titanium crosslinking agent.

An alternative method of preparing CAN-treated cellulose derivatives was found in which diesel was used as the reaction medium. Hydroxyethyl cellulose was added to the diesel to form a slurry of about 37% solids. CAN/nitric acid solution was added to the slurry and allowed to set for a minimum of ½ up to 16 hours. Polymers prepared by this method performed as well as polymers treated under nitrogen atmosphere.

In another embodiment of the present invention, the crosslinkable copolymers are prepared by reacting certain vinyl monomers having a crosslinkable substituent with a cellulose derivative using a redox system comprising the reaction product of hydrogen peroxide with a ferrous salt. The generalized redox reaction is believed to be represented by the formula:

and the generalized reaction is believed to be represented by the general formula:

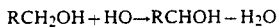

An advantage of this initiator is that radical production occurs at a reasonable rate over a wide temperature range whereby reactions can be carried out at room temperature, if desired. The free radical produced on the cellulose derivative initiates polymerization with the vinyl group of the monomer to produce the graft copolymer.

The cellulose derivative is the same as that previously described above. The copolymer is rendered crosslinkable by grafting vinyl monomers such as vinyl phosphonic acid to the cellulose derivative. The monomer is believed to attach to the cellulose derivative through the reactive $CH_2=C$-moiety. The crosslinkable substituent is provided by the phosphonate group, which enables the copolymer to crosslink upon solvation.

Typically, the graft copolymerization is carried out in aqueous media wherein the polymer is dissolved or dispersed. Copolymers were prepared in acetone/water mixtures containing from about 55 to about 90% acetone. Reactions were carried out in a 1 liter kettle with a stirrer or a 1 liter jar at a temperature of from about 20° to about 60° C. The ratio of cellulose derivative to aqueous medium ranges from about 1 gram per 100 ml. to about 1 gram per 4 ml. The preferred ratio is from about 1 gram per 9 to 30 ml. The ratio of cellulose derivative to grafting monomer ranges from about 6 to about 40 grams per 1 gram of monomer. The preferred ratio is from about 8 to about 30. It is to be understood that the ranges set forth above are merely exemplary and that other temperatures, concentrations and the like maybe utilized to prepare the reaction product.

The polymerization reaction of this embodiment of the invention is chemically initiated by a redox system comprising the reaction product of hydrogen peroxide with a ferrous salt. Ferrous ions may be provided, for example, by salts such as ferrous ammonium sulfate, ferrous chloride, ferrous sulfate, ferrous acetate, ferrous oxalate, ferrous acetylacetonate and the like. A preferred source of ferrous ions is ferrous ammonium sulfate. Alternatively, other commonly used metal ion reductants may be utilized in place of the ferrous ions to generate the free radicals necessary to effect grafting.

The initiator may be added slowly to the reaction material over a time period of about 30 to 90 seconds or longer. Reaction times vary from about 15 min to about 4 hours depending upon the reaction conditions or the particular grafting monomer. Grafting reaction efficiency (% of monomer grafted) is generally less than 50%. Typical conditions for the reactions are shown in the examples. After the reaction is complete, the polymerization product is washed with acetone, filtered and dried.

Graft copolymers of the present invention readily solubilize in aqueous liquids and substantially increase the viscosity of aqueous liquids. The viscosity of the copolymer solution may be further increased with the addition of a selected crosslinking agent. Preferred crosslinking agents in accordance with this invention comprise polyvalent metal cations such as aluminum, titanium, zirconium, chromium, antimony, and the like. Most preferred crosslinking agents provide titanium (IV) or zirconium (IV) ions in the range of about 0.005 weight percent to about 0.05 weight percent in the aqueous liquid. Examples of such crosslinking agents include triethanolamine titanate, titanium acetylacetonate, zirconium acetate, zirconium lactate and other organic complexes of titanium and zirconium capable of providing Ti (IV) and Zr (IV) ions.

One method of use of the beneficial effects of the present invention is to blend the graft copolymer of HEC or CANtreated HEC with other cellulose derivatives such as HEC or CMHEC. Blending about 20% of the polymers of the present invention in place of the HEC or CMHEC provides a cost-effective means for obtaining substantially increased gel stability. The viscosity stability of the polymer blends exceeds the stability of CMHEC alone when crosslinked with zirconium and evaluated at 250° F.

The following examples are provided to illustrate the utility of the novel treating fluid composition of the present invention, and the invention is not to be limited by these examples.

EXAMPLE 1

To a 1 liter kettle equipped with a stirrer, the following reagents were added: 6 g HEC containing 6% $H_2O$ (MS of about 2.2), 165 ml acetone, 115 ml deionized water and 1 ml GMA (98% active from Aldrich Chemicals). The kettle was purged with nitrogen for 30 minutes while stirring at 300 RPM. Ceric ammonium nitrate (CAN) solution was prepared in an addition funnel in which 0.49 g CAN was admixed with 9 ml 1N $HNO_3$ and 10 ml deionized water. The addition funnel contents were also purged with nitrogen for 30 minutes. After raising the stirring rate of the kettle stirrer to 1,000 RPM, the contents of the addition funnel are added slowly over a period of 5 minutes.

Once the CAN solution was added, the stirring rate was reduced to 300 RPM and the reaction proceeded at 40° C. After about 20 hours, the stirring rate was again increased to 1,000 RPM and acetone was added to precipitate the reaction product. The reaction product was washed with acetone and filtered 3 times, then dried in a vacuum oven until a constant weight was obtained.

The reaction product at 0.72% by weight was hydrated in 2% potassium chloride (Kcl) solution. The viscosity of the polymer solution measured 84 centipoises (cps) at 511 $s^{-1}$ using a Fann Model 35 ® viscometer. The HEC/GMA polymer solution was admixed with a diluted triethanolamine titanate crosslinker at a concentration of 5 gallons per 1000 gallons of aqueous liquid (gpt) and a highly viscoelastic gel formed at room temperature within 10 minutes. A very rigid gel formed within 30 minutes. The HEC/GMA copolymer also formed a gel upon addition of 2.5 gpt of zirconium lactate crosslinking agent after 60 minutes at 180° F.

EXAMPLE 2

To a 1 liter jar, the following reagents were added: 48 g HEC (about 2.2 MS), 270 ml acetone, 13 ml deionized water, 8 ml VPA (65% active). The jar contents were mixed using a magnetic stirrer at moderate speeds while purging with nitrogen for 30 minutes. To an addition funnel, 0.245 g CAN was admixed with 4.5 ml IN nitric acid and 4.5 ml deionized water and purged with nitrogen for 30 minutes. The CAN solution was slowly added to the 1 liter jar. The reaction proceeded at room temperature for 3 hours with continued nitrogen purging and mixing. The reaction product was washed in 500 ml acetone for 5 minutes, filtered and dried under vacuum until a constant weight was obtained.

The VPA/HEC copolymer at 0.72 weight % was solubilized in 2% Kcl and the viscosity measured 93 cps at 511 $s^{-1}$. Crosslink performance tests were conducted using triethanolamine titanate, zirconium acetylacetonate and zirconium lactate. Rigid gels formed at room temperature with a triethanolamine titanate crosslinker (5 gpt) and a zirconium acetate crosslinker (2.5 gpt). A fluid gel formed with a zirconium lactate crosslinker (3.0 gpt) at 180° F.

EXAMPLE 3

A control sample was prepared by adding 50 g HEC to 180 ml acetone in a 1 liter kettle equipped with a stirrer. The kettle contents were purged with nitrogen for 30 minutes. To an addition funnel, 2.65 g CAN, 6.0 ml 1N nitric acid and 14 ml deionized water were added and purged with nitrogen for 30 minutes. The ceric ammonium nitrate solution was added slowly to the kettle over one minute. The reaction proceeded for 90 minutes under nitrogen purge. Acetone was added to the kettle after 90 minutes to precipitate the reaction product. The precipitate was filtered and dried.

The dried product at a concentration of 0.72 weight percent was hydrated in 2% potassium chloride solution and the solution measured 94 cps at 511 $s^{-1}$. A gel formed within 15 minutes when the polymer solution was admixed with a triethanolamine titanate crosslinker.

EXAMPLE 4

To demonstrate the enhanced viscosity stability provided by these graft copolymers, the following tests were performed. Carboxymethyl hydroxyethyl cellulose (CMHEC) at 0.48% wt was solvated in 2% potassium chloride, which also contained 0.12% wt ammonium acetate buffer to provide a Ph of about 5 to the fluid, 0.04% wt urea, and 0.12% wt sodium thiosulfate. Graft copolymers of the present invention were added to the CMHEC solution at 0.12% by weight. For a control sample, an additional 0.12% of CMHEC was added. The polymer solutions were admixed with a zirconium (IV) crosslinking agent and evaluated on a FANN Model 50 ® viscometer at 250° F. The results in the table I below show a substantial increase in the viscosity stability of the gel with the addition of the graft copolymers.

TABLE I

| Grafting Monomer to HEC Ratio | | Apparent Viscosity (cps) at 170 $s^{-1}$ after 120 minutes @ 250° F. |
| --- | --- | --- |
| GMA | 1:24 | 175 |
| GMA | 1:6 | 140 |
| GAE | 1:6 | >50 |
| Control | — | <50[1] |

[1] After 40 minutes

EXAMPLE 5

To further demonstrate the enhanced viscosity stability provided by the graft copolymers of the present invention, the following tests were performed. Solutions of CMHEC and additives were prepared as described in Example 4. Graft copolymers as described in the table II below and CAN-treated HEC of the present invention were prepared and added to the CMHEC solution at 0.12% by weight. The polymer solutions were then admixed with a zirconium (IV) crosslinking agent and evaluated on a FANN Model 50 ® viscometer at 250° F. Viscosity stability of the gels made from polymer blends was remarkably consistent. Generally, initial viscosities ranged from about 150 to about 200 cps at 170 $s^{-1}$ as shown in Table II. The viscosity development peaked in the range of 200 to 350 cps at 170 $s^{-1}$ after about 25 minutes to 40 minutes elapsed time. After 120 minutes, the viscosity of the gels ranged from about 100 to 200 cps at 170 $s^{-1}$. Polymers that were CAN-treated under ambient conditions (Nos. 25 and 26) performed equally to polymers prepared under nitrogen atmosphere in these test conditions.

TABLE II

| 0.48 wt % CMHEC | | | Zirconium Crosslinker | |
| --- | --- | --- | --- | --- |
| 0.12 wt % CAN-treated polymer | | | 2% KCl | |
| 0.16 wt % stabilizer | | | 0.12 wt % Buffer | |
| | | | Viscosity (cps) at 170 $s^{-1}$ | |
| Polymer No. | Monomer | HEC/ MONOMER RATIO | Initial[1] | after 120 min. At 250° |
| 1 | — | — | 148 | 108 |
| 2 | — | — | 163 | 131 |
| 3 | — | — | 158 | 108 |
| 4 | — | — | 158 | 154 |
| 5 | — | — | 159 | 104 |
| 6 | — | — | 181 | 185 |
| 7 | — | — | 173 | 129 |
| 8 | — | — | 182 | 105 |
| 9 | AGE | 50/2 | 180 | 143 |
| 10 | AGE | 50/10 | 167 | 126 |
| 11 | GAE | 50/2 | 173 | 132 |
| 12 | GAE | 50/10 | 179 | 149 |
| 13 | GMA | 50/2 | 143 | 97 |
| 14 | GMA | 50/10 | 181 | 123 |
| 15 | VPA | 50/2 | 107 | 40 |
| 16 | VPA | 50/10 | 69 | — |
| 17 | DHPM | 50/2 | 177 | 102 |
| 18 | DHPM | 50/10 | 147 | 141 |
| 19 | — | — | 161 | 153 |
| 20 | — | — | 216 | 149 |
| 21 | — | — | 202 | 173 |
| 22 | GAE | 50/2 | 194 | 182 |
| 23 | GAE | 50/2 | 189 | 116 |
| 24 | GAE | 50/4 | 216 | 163 |
| 25[2] | — | — | 137 | 94 |
| 26[2] | — | — | 127 | 118 |
| CONTROL | — | — | 175 | <50[3] |

[1] Ambient Temperature
[2] CAN-Treated/Ambient Conditions
[3] After 40 Minutes

EXAMPLE 6

To a 1 liter jar, the following reagents were added: 26 g HEC (about 2.2 MS), 384 ml acetone, 94 ml deionized water and 0.12 ml of a 60% active solution of 1-hydroxyethylidene-1,1-diphosphonic acid and 2 ml of FAS solution. The FAS solution comprised 2 grams of ferrous ammonium sulfate (reagent grade) dissolved in 20 ml dionized water. The jar contents are mixed using a magnetic stirrer at moderate speeds while purging with nitrogen for 30 minutes.

Thereafter 2 ml 30% $H_2O_2$ was added to the reaction mixture while purging and the reaction was permitted to proceed at room temperature for one hour. The reaction product then is recovered by washing with acetone, filtration and drying under vacuum until a constant weight was obtained. The reaction product at 0.72% by weight was hydrated in 2% potassium chloride solution. The viscosity of the polymer solution measured 62 cps at 511 Sec$^{-1}$ after 1 hour and 90 cps at 24 hours using a Fann Model 35 ® viscometer.

EXAMPLE 7

The VPA/HEC copolymer of Example 6 is utilized to perform crosslinking tests at 180° F. in a water bath. The reaction product at 0.48% by weight was hydrated in 2% potassium chloride solution. The crosslinking agent was admixed with the sample in an amount of 1 gal per 1000 gallons of gelled fluid in a Waring Blendor and transferred to a sample jar that was inserted into the water bath. The samples were inspected after 30 minutes for crosslinking, then the samples were permitted to cool to room temperature and the pH was measured. The results are set forth in the table, below.

TABLE III

| Crosslinker | % Active Ingredients | Rigid Crosslink formed | pH |
| --- | --- | --- | --- |
| triethanolamine titanate | 80 | yes | 8.0 |
| zirconium oxychloride | 20 | yes | 4.0 |
| aluminum acetate | 20 | yes | 6.0 |

TABLE III-continued

| Crosslinker | % Active Ingredients | Rigid Crosslink formed | pH |
| --- | --- | --- | --- |
| zirconium N-peroxide hydroxyethyl tris-hydroxyethylenediamine | 52 | yes | 7.6 |
| zirconium lactate | 25 | yes | 6.4 |
| CL - 24 ™, a zirconate complex[1] | — | yes | 8.1 |

[1]a proprietary product of Halliburton Services, a division of Halliburton Company, Duncan, OK 73536

What is claimed is:

1. A composition of matter comprising a crosslinkable cellulose ether derivative reaction product produced by the reaction of a hydroxyalkyl cellulose having a molar substitution of from about 1.5 to about 3.0, the alkyl being selected from the group of ethyl and propyl and a vinyl phosphonic acid in the presence of a redox system at a temperature in the range of from about 20 to about 60° C.

2. The composition of claim 1 wherein the redox system is ceric ions in an acidic medium.

3. The composition of claim 1 wherein the redox system is hydrogen peroxide and a metal ion reductant.

4. The composition of claim 3 wherein the metal ion reductant is a ferrous ion.

5. The composition of claim 14 wherein the hydroxyalkyl cellulose is hydroxyethyl cellulose having a molar substitution of 1.8 to about 2.5.

* * * * *